United States Patent
Dortch et al.

(10) Patent No.: US 9,685,896 B2
(45) Date of Patent: Jun. 20, 2017

(54) STEPPER MOTOR CONTROL AND FIRE DETECTION SYSTEM

(71) Applicant: THERMAL IMAGING RADAR, LLC, Orem, UT (US)

(72) Inventors: Michael D. Dortch, Orem, UT (US); Larry J. Price, Orem, UT (US); Brian A. Wittman, Orem, UT (US); Shaun P. Greene, Orem, UT (US)

(73) Assignee: Thermal Imaging Radar, LLC, Orem, UT (US)

( * ) Notice: Subject to any disclaimer, the term of this patent is extended or adjusted under 35 U.S.C. 154(b) by 0 days.

(21) Appl. No.: 14/652,006

(22) PCT Filed: Apr. 9, 2014

(86) PCT No.: PCT/US2014/033539
§ 371 (c)(1),
(2) Date: Jun. 12, 2015

(87) PCT Pub. No.: WO2014/169061
PCT Pub. Date: Oct. 16, 2014

(65) Prior Publication Data
US 2016/0006382 A1    Jan. 7, 2016

Related U.S. Application Data

(60) Provisional application No. 61/810,192, filed on Apr. 9, 2013.

(51) Int. Cl.
*H02P 8/20* (2006.01)
*H02P 8/24* (2006.01)
(Continued)

(52) U.S. Cl.
CPC .............. *H02P 8/32* (2013.01); *H02P 8/24* (2013.01); *H02P 8/28* (2013.01)

(58) Field of Classification Search
USPC ....................................................... 318/696
See application file for complete search history.

(56) References Cited

U.S. PATENT DOCUMENTS 3,336,810 A   8/1967  Schaffer et al.
3,648,384 A   3/1972  Roberts
(Continued)

FOREIGN PATENT DOCUMENTS

CN   1639751    7/2005
CN   102176270   9/2011
(Continued)

OTHER PUBLICATIONS

U.S. Appl. No. 14/652,009, filed Jun. 12, 2015, Dortch, et al.
(Continued)

*Primary Examiner* — Eduardo Colon Santana
*Assistant Examiner* — Said Bouziane
(74) *Attorney, Agent, or Firm* — Workman Nydegger

(57) ABSTRACT

Controlling a stepper motor. A stepper motor is driven towards an index position. An attempt is made to stop the stepper motor on the index position in a fashion that would ordinarily cause the stepper motor to ring at the index position. Characteristics of one or more subsequent pulses that would counteract the ringing are determined. The one or more determined subsequent pulses are issued to the stepper motor.

20 Claims, 11 Drawing Sheets

(51) Int. Cl.
*H02P 8/32* (2006.01)
*H02P 8/28* (2006.01)

(56) References Cited

U.S. PATENT DOCUMENTS

| | | | |
|---|---|---|---|
| 3,769,501 A | 10/1973 | McDonough | |
| 3,883,788 A * | 5/1975 | Storey, Jr. | G01C 19/30 318/648 |
| 4,263,513 A | 4/1981 | Palluet | |
| 4,465,959 A * | 8/1984 | Yajima | H02P 8/32 318/685 |
| 4,602,857 A | 7/1986 | Woltz et al. | |
| 4,710,691 A * | 12/1987 | Bergstrom | H02P 8/34 318/632 |
| 4,922,275 A | 5/1990 | Hughes | |
| 4,977,323 A | 12/1990 | Jehle | |
| 4,982,218 A | 1/1991 | Tsuboi et al. | |
| 4,988,938 A | 1/1991 | Ito et al. | |
| 5,453,618 A | 9/1995 | Sutton | |
| 5,598,207 A * | 1/1997 | Kormos | F16M 11/10 348/148 |
| 5,650,813 A | 7/1997 | Gilblom | |
| D381,997 S | 8/1997 | Morooka | |
| 5,752,113 A | 5/1998 | Borden | |
| 5,790,183 A | 8/1998 | Kerbyson | |
| 5,807,950 A | 9/1998 | Da Silva | |
| 6,023,588 A | 2/2000 | Ray | |
| 6,034,716 A | 3/2000 | Whiting | |
| 6,071,740 A | 6/2000 | Kerouac | |
| 6,088,534 A * | 7/2000 | Tominaga | G03B 7/097 396/449 |
| 6,133,943 A | 10/2000 | Needham | |
| D435,577 S | 12/2000 | McBride | |
| 6,304,284 B1 | 10/2001 | Dunton | |
| 6,388,414 B1 * | 5/2002 | Kobayashi | G03B 9/08 318/266 |
| D482,712 S | 11/2003 | Hsu | |
| 6,677,982 B1 | 1/2004 | Chen | |
| D486,847 S | 2/2004 | Uehara | |
| 6,738,073 B2 | 5/2004 | Park et al. | |
| 6,809,887 B1 | 10/2004 | Gao | |
| 6,948,402 B1 | 9/2005 | Amendolea | |
| 6,991,384 B1 | 1/2006 | Davis | |
| 6,992,722 B2 | 1/2006 | Jung | |
| D520,548 S | 5/2006 | Tsai | |
| 7,088,907 B1 * | 8/2006 | Nishijima | G08B 13/19645 348/143 |
| D543,644 S | 5/2007 | Bembridge | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 | 10/2008 | Sim et al. | |
| 7,525,567 B2 | 4/2009 | McCutchen | |
| 7,561,187 B2 | 7/2009 | Umezaki | |
| 7,732,771 B2 | 6/2010 | Hasegawa et al. | |
| D640,721 S | 6/2011 | Satine | |
| 7,991,575 B2 | 8/2011 | Vogel et al. | |
| 8,106,936 B2 | 1/2012 | Strzempko et al. | |
| 8,194,912 B2 | 6/2012 | Kitaura et al. | |
| 8,285,512 B2 | 10/2012 | Vogel et al. | |
| D673,988 S | 1/2013 | Riegl | |
| 8,355,042 B2 | 1/2013 | Lablans | |
| 8,594,483 B2 | 11/2013 | Koyanagi | |
| D695,809 S | 12/2013 | Katori | |
| 8,773,503 B2 | 7/2014 | Dortch et al. | |
| D728,655 S | 5/2015 | Daniel | |
| D741,388 S | 10/2015 | Register | |
| 2001/0026684 A1 | 10/2001 | Sorek et al. | |
| 2001/0027456 A1 | 10/2001 | Lancaster et al. | |
| 2002/0025023 A1 | 2/2002 | Herold et al. | |
| 2002/0185926 A1 * | 12/2002 | King | H02P 6/182 310/68 B |
| 2003/0025599 A1 | 2/2003 | Monroe | |
| 2003/0174056 A1 | 9/2003 | Harshaw | |
| 2004/0075741 A1 | 4/2004 | Berkey et al. | |
| 2004/0155558 A1 * | 8/2004 | Cuttino | H01L 41/0906 310/317 |
| 2004/0179098 A1 | 9/2004 | Haehn | |
| 2004/0183941 A1 | 9/2004 | McCutchen | |
| 2004/0257026 A1 * | 12/2004 | Rogers | H02P 8/14 318/696 |
| 2005/0261820 A1 | 11/2005 | Feeney | |
| 2005/0285953 A1 * | 12/2005 | Hasegawa | G08B 13/19608 348/239 |
| 2007/0115527 A1 | 5/2007 | Lee | |
| 2008/0106593 A1 | 5/2008 | Arfvidsson et al. | |
| 2008/0159732 A1 * | 7/2008 | Young | G03B 17/00 396/427 |
| 2009/0051310 A1 * | 2/2009 | Chandhoke | G05B 19/40 318/685 |
| 2010/0091089 A1 | 4/2010 | Cromwell et al. | |
| 2010/0097444 A1 | 4/2010 | Lablans | |
| 2010/0142757 A1 | 6/2010 | Sandstrom et al. | |
| 2011/0058036 A1 | 3/2011 | Metzger | |
| 2011/0174762 A1 | 7/2011 | Tsai | |
| 2011/0220797 A1 | 9/2011 | Hoelter et al. | |
| 2011/0316970 A1 | 12/2011 | Cheong | |
| 2012/0127169 A1 | 5/2012 | Barcay et al. | |
| 2012/0133639 A1 | 5/2012 | Kopf et al. | |
| 2012/0155744 A1 | 6/2012 | Kennedy | |
| 2012/0194564 A1 | 8/2012 | White et al. | |
| 2012/0293334 A1 | 11/2012 | Yu | |
| 2012/0299920 A1 | 11/2012 | Coombe et al. | |
| 2012/0300019 A1 | 11/2012 | Yang et al. | |
| 2012/0314066 A1 | 12/2012 | Lee et al. | |
| 2012/0320148 A1 | 12/2012 | Unger | |
| 2013/0002807 A1 | 1/2013 | Vogel et al. | |
| 2013/0009588 A1 | 1/2013 | Kawada | |
| 2013/0030699 A1 | 1/2013 | Barnes et al. | |
| 2013/0048855 A1 | 2/2013 | Abreo | |
| 2013/0079955 A1 | 3/2013 | Masiello et al. | |
| 2013/0103303 A1 | 4/2013 | Lynch | |
| 2013/0113827 A1 | 5/2013 | Forutanpour et al. | |
| 2013/0176130 A1 | 7/2013 | Hoesl | |
| 2013/0188010 A1 | 7/2013 | Dortch et al. | |
| 2014/0192184 A1 | 7/2014 | Wu | |
| 2015/0062337 A1 | 3/2015 | Scalisi | |
| 2015/0116741 A1 * | 4/2015 | Ogino | G06T 11/60 358/1.9 |
| 2015/0365607 A1 | 12/2015 | Yang | |

FOREIGN PATENT DOCUMENTS

| | | |
|---|---|---|
| GB | 2433127 | 6/2007 |
| KR | 10-2009-0067762 | 6/2009 |
| RU | 2012140240 | 9/2012 |
| WO | 2013/109742 | 7/2013 |
| WO | 2013/109976 | 7/2013 |
| WO | 2014/169061 | 10/2014 |
| WO | 2014/169066 | 10/2014 |
| WO | 2015/021186 | 2/2015 |

OTHER PUBLICATIONS

U.S. Appl. No. 14/738,391, filed Jun. 12, 2015, Dortch, et al.
U.S. Appl. No. 14/456,329, filed Aug. 11, 2014, Dortch.
U.S. Appl. No. 29/523,032, filed Apr. 6, 2015, Dortch, et al.
Chu, Elbert. "Invention Awards 2014: 360-Degree Infrared Vision." Popular Science. May 5, 2014. Web. Accessed Feb. 27, 2015.
U.S. Appl. No. 13/745,514, Jan. 10, 2014, Office Action.
U.S. Appl. No. 13/745,514, Apr. 11, 2014, Notice of Allowance.
U.S. Appl. No. 14/456,329, May 14, 2015, Restriction Requirement.
U.S. Appl. No. 14/456,329, Jan. 21, 2016, Notice of Allowance.
U.S. Appl. No. 15/159,523, filed May 19, 2015, Dortch.
U.S. Appl. No. 15/369,117, filed Dec. 5, 2016, Dortch.
U.S. Appl. No. 14/456,329, Oct. 1, 2015, Office Action.
U.S. Appl. No. 14/652,009, Nov. 18, 2015, Office Action.
U.S. Appl. No. 14/652,006, Mar. 22, 2016, Final Office Action.
U.S. Appl. No. 14/652,009, Apr. 18, 2016, Notice of Allowance.
U.S. Appl. No. 29/523,032, Apr. 21, 2016, Office Action.
U.S. Appl. No. 14/738,391, Apr. 25, 2016, Office Action.

(56) References Cited

OTHER PUBLICATIONS

U.S. Appl. No. 29/523,032, Jul. 20, 2016, Notice of Allowance.
U.S. Appl. No. 14/738,391, Aug. 4, 2016, Notice of Allowance.
Hughes, et al., "Electromagnetic Damping in Stepping Motors," in Proceedings of the Institution of Electrical Engineers, vol. 122, No. 8, Published Aug. 1, 1975.

* cited by examiner

Data Derived from Scope Pictures

| Num Of Stops | Step Movement Time | Camera Acq. Time | Enable Time | Complete Time Per Stop | Non-Enabled Current | Enabled Current | Min. Time Per Rev | Max RPM |
|---|---|---|---|---|---|---|---|---|
| 6 | 0.105 | 0.063 | 0.0765 | 0.168 | 0.0076 | 0.1154 | 1.008 | 59.5 |
| 9 | 0.0819 | 0.063 | 0.0544 | 0.1449 | 0.0076 | 0.1226 | 1.3041 | 46.0 |
| 10 | 0.0688 | 0.063 | 0.0484 | 0.1318 | 0.0076 | 0.1281 | 1.318 | 45.5 |
| 12 | 0.0679 | 0.063 | 0.0421 | 0.1309 | 0.0076 | 0.1313 | 1.5708 | 38.2 |
| 15 | 0.0585 | 0.063 | 0.0368 | 0.1215 | 0.0076 | 0.141 | 1.8225 | 32.9 |
| 16 | 0.0585 | 0.063 | 0.0339 | 0.1215 | 0.0076 | 0.14 | 1.944 | 30.9 |

702

Power Calculation

| Num Of Stops | RPM | Time Per Rev (sec) | Complete Time Per Stop | Enable Time | Enabled Current | Non-Enabled Current | I Avg. (A) | P Avg. (W) | P Avg. (W) For Cam-Follower System | Power Savings With Stepper |
|---|---|---|---|---|---|---|---|---|---|---|
| 6 | 10 | 6.000 | 1.000 | 0.0765 | 0.1154 | 0.0076 | 0.016 | 0.197 | | |
| 6 | 20 | 3.000 | 0.500 | 0.0765 | 0.1154 | 0.0076 | 0.024 | 0.296 | | |
| 6 | 30 | 2.000 | 0.333 | 0.0765 | 0.1154 | 0.0076 | 0.032 | 0.395 | | |
| 6 | 40 | 1.500 | 0.250 | 0.0765 | 0.1154 | 0.0076 | 0.041 | 0.494 | | |
| 6 | 50 | 1.200 | 0.200 | 0.0765 | 0.1154 | 0.0076 | 0.049 | 0.593 | | |
| 6 | 60 | 1.000 | 0.167 | 0.0765 | 0.1154 | 0.0076 | 0.057 | 0.692 | | |
| 9 | 10 | 6.000 | 0.667 | 0.0544 | 0.1226 | 0.0076 | 0.017 | 0.210 | 0.48 | 0.270 |
| 9 | 20 | 3.000 | 0.333 | 0.0544 | 0.1226 | 0.0076 | 0.026 | 0.323 | 0.63 | 0.307 |

704

(Continued On Sheet 8)

*FIG. 7*

(Continued From Sheet 7)

| | | | | | | | | |
|---|---|---|---|---|---|---|---|---|
| 9 | 30 | 2.000 | 0.222 | 0.0544 | 0.1226 | 0.0076 | 0.036 | 0.436 | 0.87 | 0.434 |
| 9 | 40 | 1.500 | 0.167 | 0.0544 | 0.1226 | 0.0076 | 0.045 | 0.548 | 0.89 | 0.342 |
| 9 | 45 | 1.333 | 0.148 | 0.0544 | 0.1226 | 0.0076 | 0.050 | 0.605 | | |
| 10 | 10 | 6.000 | 0.600 | 0.0484 | 0.1281 | 0.0076 | 0.017 | 0.214 | | |
| 10 | 20 | 3.000 | 0.300 | 0.0484 | 0.1281 | 0.0076 | 0.027 | 0.331 | | |
| 10 | 30 | 2.000 | 0.200 | 0.0484 | 0.1281 | 0.0076 | 0.037 | 0.448 | | |
| 10 | 40 | 1.500 | 0.150 | 0.0484 | 0.1281 | 0.0076 | 0.046 | 0.564 | | |
| 10 | 45 | 1.333 | 0.133 | 0.0484 | 0.1281 | 0.0076 | 0.051 | 0.623 | | |
| 12 | 10 | 6.000 | 0.500 | 0.0421 | 0.1313 | 0.0076 | 0.018 | 0.223 | 0.52 | 0.297 |
| 12 | 20 | 3.000 | 0.250 | 0.0421 | 0.1313 | 0.0076 | 0.028 | 0.348 | 0.66 | 0.312 |
| 12 | 30 | 2.000 | 0.167 | 0.0421 | 0.1313 | 0.0076 | 0.039 | 0.473 | 0.78 | 0.307 |
| 12 | 40 | 1.500 | 0.125 | 0.0421 | 0.1313 | 0.0076 | 0.049 | 0.598 | 0.91 | 0.312 |
| 15 | 10 | 6.000 | 0.400 | 0.0368 | 0.141 | 0.0076 | 0.020 | 0.245 | 0.5 | 0.255 |
| 15 | 20 | 3.000 | 0.200 | 0.0368 | 0.141 | 0.0076 | 0.032 | 0.392 | 0.66 | 0.268 |
| 15 | 30 | 2.000 | 0.133 | 0.0368 | 0.141 | 0.0076 | 0.044 | 0.540 | 0.81 | 0.270 |
| 15 | 35 | 1.714 | 0.114 | 0.0368 | 0.141 | 0.0076 | 0.051 | 0.613 | | |
| 16 | 10 | 6.000 | 0.375 | 0.0339 | 0.14 | 0.0076 | 0.020 | 0.241 | | |
| 16 | 20 | 3.000 | 0.188 | 0.0339 | 0.14 | 0.0076 | 0.032 | 0.385 | | |
| 16 | 30 | 2.000 | 0.125 | 0.0339 | 0.14 | 0.0076 | 0.044 | 0.529 | | |
| 16 | 35 | 1.714 | 0.107 | 0.0339 | 0.14 | 0.0076 | 0.049 | 0.600 | | |

*FIG. 7 (Continued)*

STEPPER MOTOR CONTROL AND FIRE DETECTION SYSTEM

CROSS-REFERENCE TO RELATED APPLICATIONS

This application claims the benefit of Patent Cooperation Treaty Application Number PCT/US2014/033539, with an international filing date of Apr. 9, 2014, which claims priority to U.S. Provisional application No. 61/810,192 filed Apr. 9, 2013. Each of the foregoing is incorporated herein by reference in its entirety.

BACKGROUND

In thermal imaging applications, taking a thermal image can take a significant amount of time as compared to visible light image applications. For example, to take a still thermal image, a camera may need to be held still for about 66 ms to capture the image without significant blur. Further, when automating image capture, motors and controllers may be used to position the camera. It may take a significant amount of time to bring a motor connected to a camera to a complete stop such that an image without significant blur can be captured. Thus, when the amount of time to start and stop motors is added to the amount of time when a camera must be held still, a significant limitation in the number of images in a given period of time that can occur may exist.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for controlling a stepper motor. The method includes driving a stepper motor towards an index position. The method further includes attempting to stop the stepper motor on the index position in a fashion that would ordinarily cause the stepper motor to ring at the index position. The method further includes determining characteristics of one or more subsequent pulses to counteract the ringing. The method further includes issuing the one or more determined subsequent pulses.

Another embodiment includes a motor system configured to dampen ringing of a stepper motor when stopping the stepper motor. The system includes a stepper motor. The stepper motor is configured to be driven to an index position. The stepper motor ordinarily exhibits ringing of a rotor of the motor when initially stopped at the index position. The system further includes a controller coupled to the stepper motor. The controller is configured to emit one or more pulses to the stepper motor. The one or more pulses are configured to counteract the ringing of the rotor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates a table correlating various stepper motor performance characteristics;

DETAILED DESCRIPTION

Figure 1:
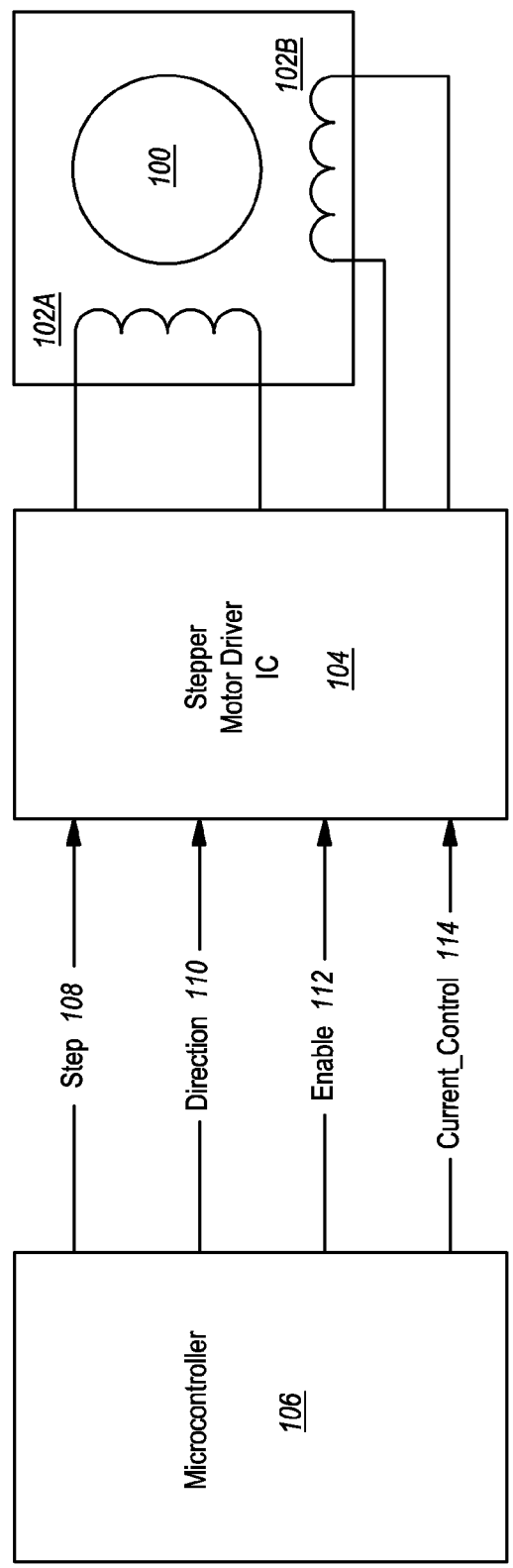
FIG. 1 illustrates a block diagram for a stepper motor, motor controller and microcontroller.

Some embodiments herein implement a stepper motor control system that allows a stepper motor to accelerate from a stop and brake to a stop with minimal ringing.

A non-stepper DC motor rotates continuously, due to magnetic forces when a voltage is applied to the motor. A stepper motor, on the other hand, uses a series of windings, which when appropriately energized cause the rotor to move a partial rotation, or a "step". The windings can be energized in sequence such that precise rotational positioning of the stepper motor rotor can be achieved within the step granularity of the motor. Additionally, reversing the sequence will cause the rotor to move in the opposite direction.

Any desired angular position can be achieved, within the resolution of one step, by stepping the motor from its current position to the new desired position. This is done one step at a time by repeatedly energizing the windings in the proper sequence. Stepping the motor repeatedly is used to generate a smooth motion from the current to the new desired position. The maximum speed that can be achieved is a function of motor drive current, the torque characteristics of the stepper motor, and the total torque and inertial loading of the system. If the stepper motor cannot provide enough torque to move to the next step, then the motor will "slip" which means it will not advance to the next step and positional integrity will be lost. In addition to any friction which may be present, any mechanical system possesses some inertia which must be overcome when accelerating from a stopped position. Since a stepper motor's torque decreases with increasing speed, an acceleration profile can be achieved by energizing the windings with specific timing so that the time between steps is greater at first and then decreases to a minimum as the system rotates up to speed. Similarly, when decelerating, the time between steps can be lengthened as the system slows down. These techniques are needed because any realistic mechanical system cannot be instantly accelerated to maximum velocity nor instantly stopped once it is rotating at full speed. Even when these techniques are used, the instantaneous rotational velocity will not be ideal, for example, a "triangular" velocity profile that starts at zero, ramps up evenly to a maximum speed, and then ramps down evenly back to zero. Some raggedness in the response will always exist due to the fact that the mechanical system possesses both friction and inertia, thereby creating a $2^{nd}$ order response to any rotational input from the stepper motor. Often, the resulting $2^{nd}$ order system is underdamped, and this results in some "ringing" in the velocity response of the system. Ringing may be visualized as causing the rotor of the motor to rotate back and forth in a logarithmically decreasing rotational amplitude until the rotor comes to a stop, or a small enough amplitude that the rotor can be considered to be stopped. At this point, precise operations, such as taking a still frame picture with a camera coupled to the rotor, can be performed without introducing significant errors (such as blurring of an image).

Some embodiments described herein can significantly reduce the ringing, in time and/or amplitude, by careful timing of step pulses to the motor. In some embodiments, this can include careful timing and selection of step pulses to drive the motor to a desired position, as well as pulses to counteract ringing. In some embodiments, ringing can be sufficiently counteracted with a single step pulse issued to an appropriate winding at an appropriate time. Embodiments can accelerate a load quickly from a dead stop, move it to the next desired position in a minimal amount of time, and then stop it quickly, including dampening the ringing. Once stopped, the motor windings can, in some embodiments, be completely de-energized because the rotor will be held in place by the detent torque of the stepper motor. This will reduce the energy consumption of the stepper motor. The energy savings can be considerable, depending upon the percentage of time moving vs. stationary, because, when not de-energized, a stepper motor consumes power just to remain stationary.

As shown in FIG. 1, one embodiment utilizes a stepper motor driver IC 104 to drive the windings 102A and 102B of the stepper motor 100 and a microcontroller 106 to control the driver IC. The details of energizing the motor windings 102A and 102B are left to the driver IC 104 so that when the microcontroller 106 wishes to move the rotor to the next step it simply issues one pulse on the STEP signal 108 and the motor driver IC 104 handles the sequencing of current to the windings 102A and 102B. The microcontroller 106 controls the direction of rotation, either clockwise or counter-clockwise, by way of the DIRECTION signal 110. The microcontroller 106 can also energize or de-energize the outputs of the motor driver IC by way of the ENABLE signal 112.

As mentioned above, the stepper motor's torque is related to the drive current. This can be fixed, or if desired put under microcontroller control as shown in FIG. 1. Here the voltage on the CURRENT_CONTROL signal 114 is used to adjust the stepper motor drive current used by the motor driver IC 104. This can be achieved, for example, by using a digital-to-analog converter under microcontroller control to generate a varying DC voltage which controls the current. Many microcontrollers include a pulse-width modulated (PWM) output, which can be used along with suitable low-pass filtering to generate a varying DC voltage under microcontroller control. In an alternative embodiment, one or more microcontroller general purpose I/O (GPIO) lines are used to control MOSFET or bipolar switches to generate a few discrete voltage levels on the CURRENT_CONTROL signal 114.

There are several reasons why it could be quite useful to control the stepper motor drive current. If, for example, the amount of required torque changes with environmental factors such as temperature, the torque could be adjusted as needed by controlling the drive current to compensate for these environmental factors. Changing the drive current dynamically over the motion interval can have several advantages. The greatest torque is needed when first accelerating from a dead stop, so dynamically adjusting the current to be high at the start and then decrease as the motor turns allows more subtle tuning of a velocity profile that provides both quick motion, quickly bringing a motor to a stopped position, and maximum power savings.

When to issue the step pulses (whether for driving the motor to a new position, to stop the motor, or to counteract ringing) can be determined in a number of different ways. For example, in some embodiments, by simply knowing the characteristics of the motor and its installation through previous measurements and calculations (e.g. inertia of the system, responsiveness of the system, etc.), the timing of the step pulses can be based on a calculation of what is anticipated to happen. In particular, there may be no direct feedback indicating the exact position or rotational velocity of the motor's rotor. As long as the stepper motor does not "slip", due to producing less than the required amount of torque to move to the next requested step, the microcontroller should know the position of the stepper motor. This requires a known "home" position. This can be indicated by a photo-interrupter, hall-effect sensor or other method. Once the motor has reached the "home" position, the microcontroller can calculate the present position simply by counting the number and direction of step pulses that have occurred since the "home" position was achieved. For example, if after reaching the "home" position 37 steps are generated in a clockwise direction for a 400-step stepper motor, then the motor's rotor will have moved 33.3 degrees clockwise from the "home" position.

In an alternative embodiment, feedback mechanisms may be coupled to the motor rotor that can be used to determine angular velocity of the rotor and any equipment coupled to the rotor. For example, a gyroscope or encoder may be used to detect angular velocity. Such an example is illustrated in FIG. 2.

Figure 2:
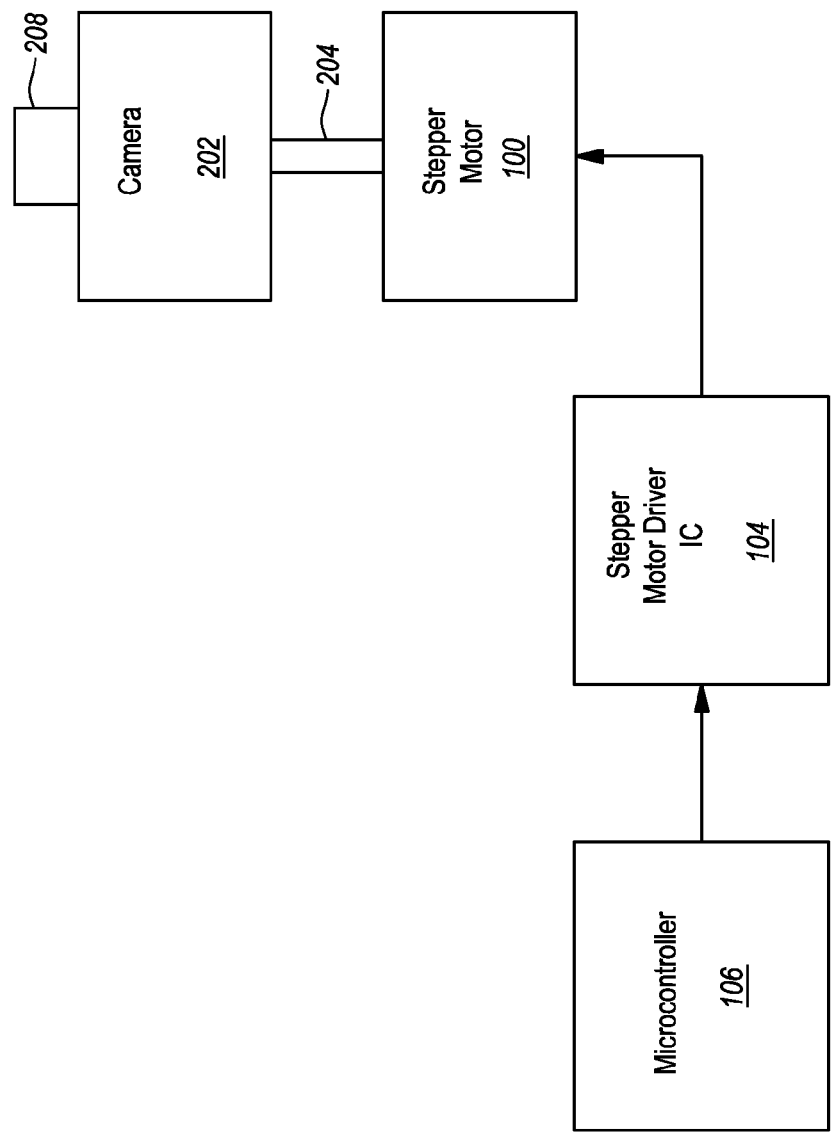
FIG. 2 illustrates a block diagram further illustrating a camera and sensor coupled to a stepper motor.

FIG. 2 illustrates a stepper motor 100 with a camera 202 coupled to the rotor 204 of the stepper motor 100. Rotation of the stepper motor 100 may be controlled by a stepper motor driver IC 104 which is connected to a microcontroller 106 that can issue step pulses with particular timing as described above. In this particular example, the camera may be a thermal imaging camera. It may be desirable to move the camera to various angles and to take a thermal image at each position. To take the thermal images, the camera needs to be stopped and held still at the angle for which an image is desired. Thus, as the camera is moved into position, it will need to be stopped and held for a sufficient period of time to take the thermal image and a trigger pulse issued to the camera. To increase the number of images that may be taken during a given period of time, starting and stopping the camera quickly, including reducing ringing in terms of either or both of time and amplitude, can be beneficial.

In the example, illustrated, a sensor 208, such as a gyroscope or encoder, may be coupled to the rotor 204 of the motor 100. That is accomplished in this example by mounting the sensor 208 to the camera 202 which is coupled to the rotor 204. Information from the sensor can be used to determine the rotational velocity of the rotor 204. This information can be used to determine angular velocity of the rotor, the camera, and any other equipment coupled to the rotor such that the timing of the step pulses (to move the camera and stop the camera) and the camera trigger pulse can be optimized. The information from the sensor 208 can be processed through the use of a look-up table or other data structures. For example, historical data may be stored indicating how the system performs and reacts to pulses when operating at certain rotational velocities. By knowing a rotational velocity as measured by the sensor 208, the system can issue appropriate pulses to achieve a desired effect (such as stopping the camera with minimal ringing).

Alternatively, an equation may be used to calculate step pulses and camera trigger pulse timing in real time. The equation may take into account factors such as motor characteristics, camera weight, temperature, angular velocity, etc.

As an alternative method to using a gyroscope as described above, a shaft encoder can be used to provide the sensor function. In this case, rotational position rather than rotational velocity is indicated by the sensor.

The method may further include issuing one or more step pulses that are carefully timed to counteract the mechanical ringing created by the previous motion of the motor and mechanical system. This technique can be used, for example, to bring the system to a stop as quickly as possible, allowing faster operation and more power savings.

In some embodiments, indexing may include indexing a camera position. In some such embodiments, the camera may be a thermal camera. Alternatively, embodiments may index the position of other sensors or other devices.

As mentioned above, embodiments of the method may include cutting power to the windings 102A and 102B after the last step pulse to save power. In these cases embodiments can rely on the detent torque to hold the rotor in place. However, in other embodiments, a holding current may be applied to the windings to keep the rotor in place.

As noted above, determining the optimum timing of step pulses (and possibly the instantaneous motor drive current) to counteract the ringing may include performing a real-time calculation based on sensor data. Such real time calculations may take into account various factors such as the number of requested steps, temperature, instantaneous rotational position or velocity, and possibly other factors. In particular, an equation or set of equations with those factors may be used to control timing, direction, current, etc. for step pulses.

Alternatively or additionally, determining the optimum timing of step pulses (and possibly the instantaneous motor drive current) to counteract the ringing may include referencing previously generated empirical data. For example, a table lookup or other action may be performed based on historical information that may be useful in determining optimum step pulse timing and possibly changes to the motor drive current.

As noted above, and as illustrated in FIG. 2, determining the optimum timing of step pulses (and possibly the instantaneous motor drive current) to counteract the ringing may include observing a gyroscope coupled to the stepper motor to determine ringing characteristics.

As noted above, and as illustrated in FIG. 2, determining the optimum timing of step pulses (and possibly the instantaneous motor drive current) to counteract the ringing may include observing a shaft encoder coupled to the stepper motor to determine ringing characteristics.

Additional specific details are now illustrated with respect to some embodiments of the present invention.

Figure 3:
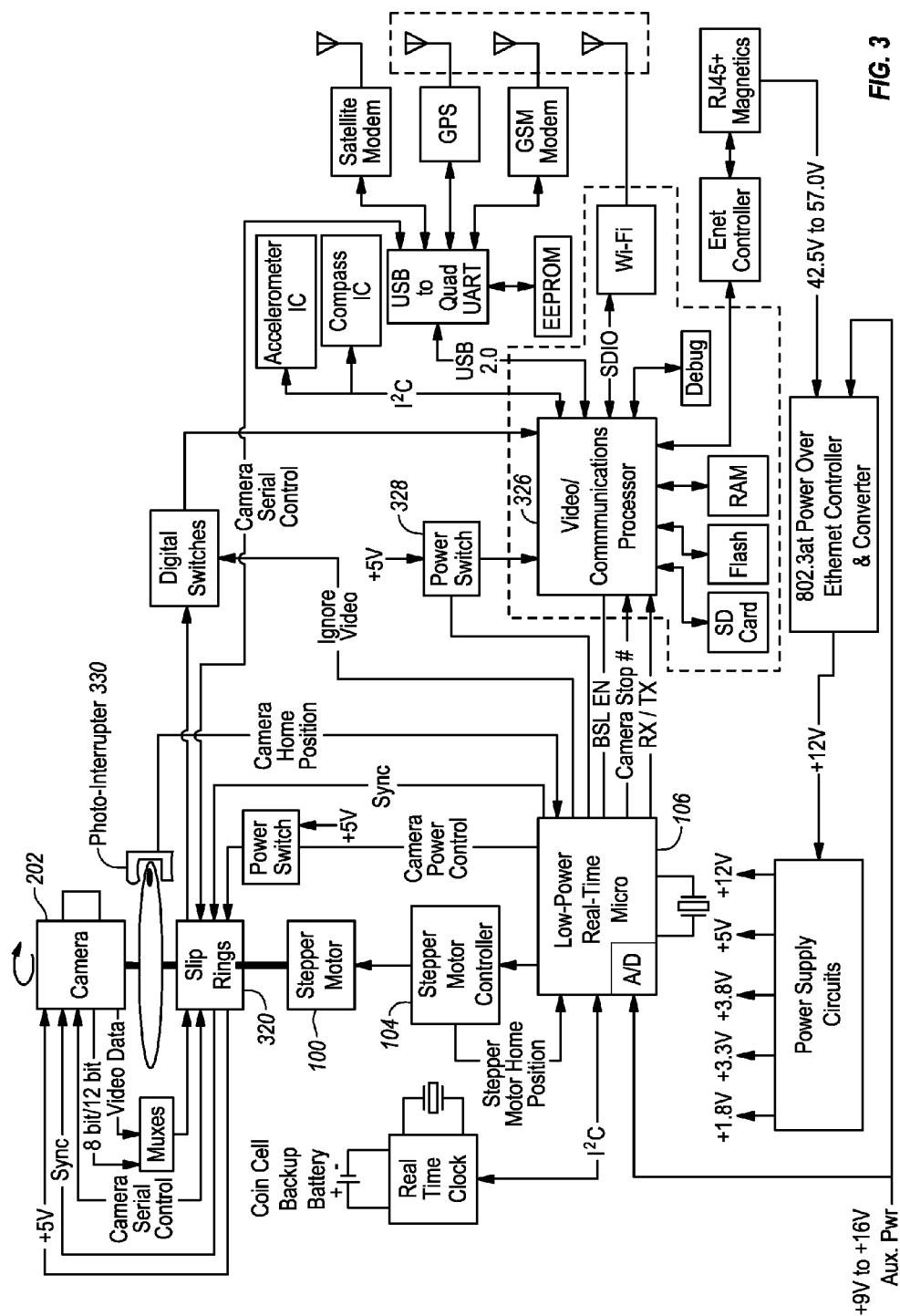
FIG. 3 illustrates a more detailed block diagram of a stepper motor and various components used with the stepper motor.

Referring now to FIG. 3, an infrared camera 202 rotates continuously in an incremental fashion at the top of the unit. A stepper motor 100 is used to move the camera with a high level of granularity, or slowly, between fixed stop locations. The stop locations are equally spaced around the circumference of the camera's motion. The number of stops can be any number, but in one particular system embodiments are targeting the number of stops to be between 6 and 16. When momentarily stopped, the camera 202 is triggered by a sync pulse to capture an image, which is fed to a computer board for processing. Because the camera 202 rotates and the rest of the unit does not, camera power, control and video signals are fed through slip rings 320.

For the examples illustrated herein, The FLIR Tau 2 640 and 336 cameras available from FLIR System, Inc. of Wilsonville, Oreg. are used.

Rotational speeds from 10 to 60 rpm may be implemented in some embodiments. The number of stops per revolution can be configured, in some embodiments, between 6 and 15 stops (one particular system has been designed for a maximum of 16 stops since 16 positions can be specified by a 4-bit binary code). Table 1 below shows the various requested combinations of stops and rotational speed, and the resulting frame rate for the camera to output one video frame per stop. The effective frame rate varies by a factor of fifteen from 1.0 fps to 15 fps.

TABLE 1

Combinations of Speed & Stops

| RPM | 6 STOPS/REV | 9 STOPS/REV | 12 STOPS/REV | 15 STOPS/REV |
|---|---|---|---|---|
| 10 | 1.0 fps | 1.5 fps | 2.0 fps | 2.5 fps |
| 20 | 2.0 fps | 3.0 fps | 4.0 fps | 5.0 fps |
| 30 | 3.0 fps | 4.5 fps | 6.0 fps | 7.5 fps |
| 60 | 6.0 fps | 9.0 fps | 12.0 fps | 15.0 fps |

Not all of these combinations are achievable within the power budget and without motion blur in the image. This is because the camera 202 needs to stay near motionless for a minimum period of time to take a clear image and certain rotational speed and number of stops combinations do not allow for the minimum stopped time for a clear image.

The camera is stopped for a long enough time to avoid blurring and artifacts from previous scenes. Specifically, the camera is moved into place. It then stays near motionless for, in the illustrated embodiment, 3 time constants of 10 ms, or a total of 30 ms. After 30 ms, the camera 202 is triggered with a sync pulse and, after triggering, remains near motionless for an additional 33 ms during data readout. This implies a minimum total stopped time of 63 ms to prevent motion blurring. If some image degradation is acceptable, the stopping time can be reduced and the average rotational speed in RPM can be increased.

Figure 4:
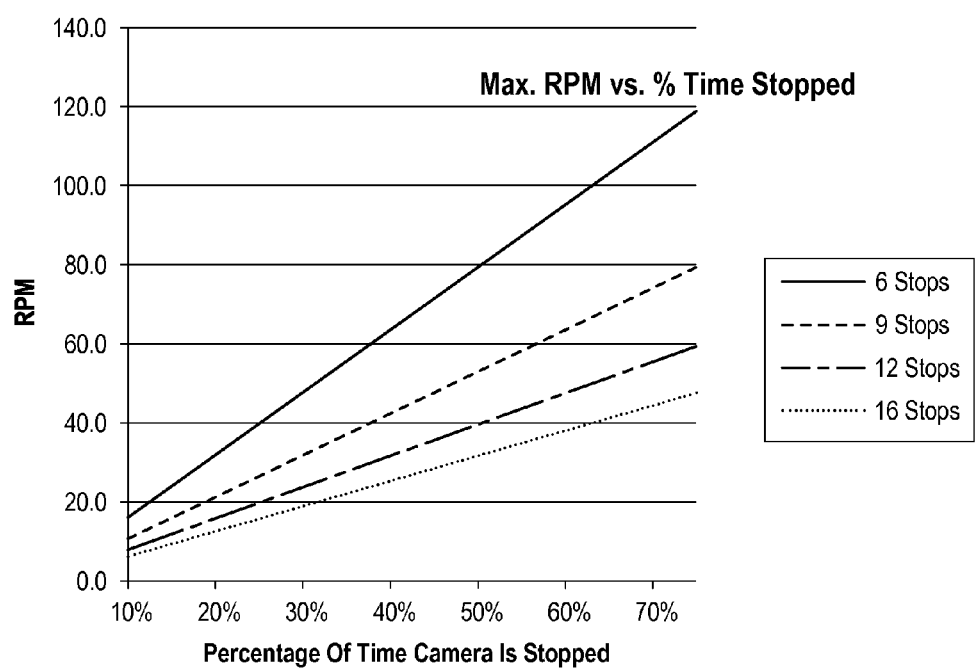
FIG. 4 illustrates a graph correlating RPM of a stepper motor with a percentage of time stopped for different numbers of stops.

FIG. 4 illustrates a graph showing how the selected camera's performance impacts the maximum attainable rotational speed in RPM. Note that FIG. 4 illustrates performance for a particular camera and performance may be different for different cameras. The horizontal axis is the percentage of time that the camera 202 remains near motionless during each stop. This percentage is determined by the mechanical driving system. Increasing this percentage causes the camera 202 be accelerated and decelerated quicker (so that it remains near motionless longer), which will consume more electrical power and exert higher G forces on the camera 202, possibly leading to damage. The vertical axis is the maximum attainable RPM while still observing the 63 ms acquisition time described above. As one would expect, adding more stops will result in slower attainable speeds. The rotational speed can be increased, for a given number of stops per revolution, by spending less time in motion, thereby increasing the percentage of stopped time, but as stated previously, this uses more electrical power for quicker acceleration and deceleration and possibly damages the camera 202.

Another factor is how often the camera is triggered. The camera may not produce valid data if triggered below a 2 Hz rate, so that is a lower bound in the particular illustrated embodiment. 30 Hz is the upper limit, in this embodiment, because of the 33 ms it takes to read an image. Table 1 above shows the need to go down to 1.0 fps for a speed of 10 RPM with 6 stops per revolution. This is less than 2 Hz (2 fps). Some embodiments may trigger the camera as slow as possible, but (in this particular illustrated embodiment) always at 2 fps or greater (increasing the RPM above 10 RPM as needed to stay above 2 fps). However, in some embodiments, the camera is triggered at a faster rate and intermediate frames are thrown away.

Embodiments may implement a scheme where the camera is triggered at a faster rate, for example 20 Hz, but only the frame corresponding to the motionless interval is inputted, and the rest are ignored or thrown away.

Another implication of FIG. 4 is that as the camera can be moved as quickly as possible between stops for greater average rotational speed.

Figure 5:
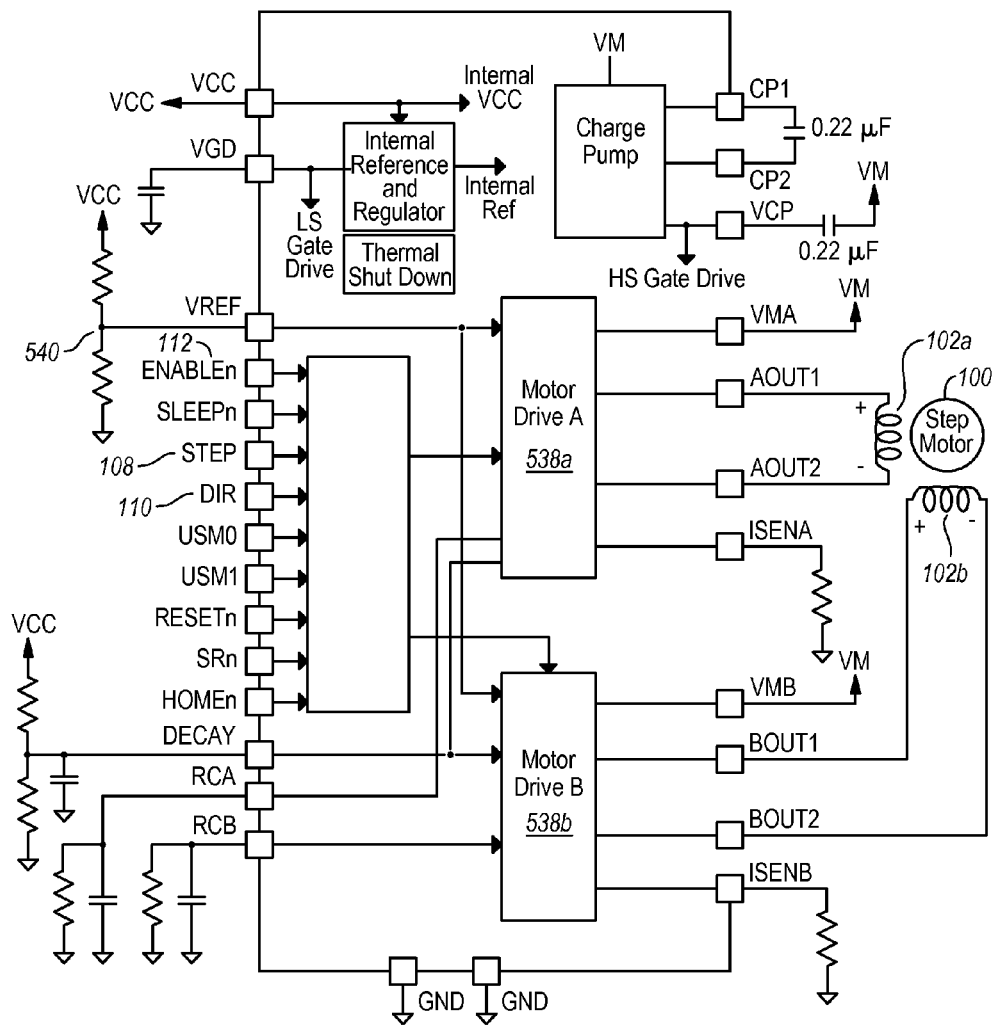
FIG. 5 illustrates a stepper motor controller block diagram.

A block diagram of the entire camera motor controller 104 is shown in FIG. 5.

As shown in FIG. 3, the low-power micro 106 generates the number of pulses to rotate the camera 202 to the next stop location. While the camera 202 is stopped, a properly-timed sync signal is generated by the micro 106 to trigger the camera 202. The micro generates a 4-bit code to the video/communications processor 326 to tell it the current stop location. Up to 16 stop positions can be achieved using 4 lines. As some embodiments do not trigger the camera 202 any slower than 15 fps, the low-power micro 106 generates extra sync pulses while the camera 202 is still moving, and it then gates off the resulting video signals so they are not inputted to the video processor 326 (this gating is shown in FIG. 3 as external digital switches 328). For example, at 10 RPM and 9 stops, the camera 202 can be triggered at a rate of 18 fps, but only 1 frame in every 12 is used. This achieves an effective video frame rate of 1.5 fps.

The use of a photo-interrupter 330 may be used to determine when the camera is in its "home" position.

A stepper motor implementation has the following potential advantages compared with other mechanisms to turn the camera:
 Quieter operation
 Can turn either clockwise or counter-clockwise
 Finer resolution with more control (micro can generate step pulses directly)
 Easier to synchronize with camera video
 Number of stops can be changed in real time by the firmware
 Camera can easily be stopped when and where desired
 Motor position is known at all times
 Fewer mechanical parts to wear-out (no cam mechanism, but motor can still wear out)
 Can consume less power than a cam-system when controlled properly Ideally, the number of stops should divide evenly into the number of steps provided by the stepper motor 100, but if not, this can be easily accommodated by adjusting the number of steps between stops. For example, for a 12-stop system using a 200-step motor, one complete revolution can be achieved by stepping 16, 17, 17, 16, 17, 17, 16, 17, 17, 16, 17, 17 steps. This results in a total of 200 steps. An odd number of stops can be accommodated by adjusting the number of steps in each stop. For example, a 9-stop system can be achieved by stepping 22, 22, 22, 23, 22, 22, 22, 22, 23 steps, for a total of 200 steps. In this case, the angular distance between adjacent stops would be either 39.6° (22 steps) or 41.1° (23 steps), which results in a small angular difference of only 1.8° between the narrowest and widest stop angles. Using a 400-position stepper motor allows for even smoother acceleration and deceleration, and the maximum resulting angular error is reduced to only 0.9°.

Some embodiments implement the Oriental Motors PK245M-01AA stepper motor. This is a 400-step motor, rated to deliver 380 mNm of torque at 0.85 A (driven in bipolar series arrangement). Each winding, in bipolar series connection, has 6.6 ohms of resistance and 15.6 mH of inductance. This motor is 42 mm on each side, with an overall length of 47 mm. The specified ambient temperature range is −10° C. to +50° C.

A Texas Instruments DRV8811 stepper motor drive evaluation board available from Texas Instruments of Dallas Tex. may be used as the stepper motor controller 104 to drive the stepper motors 300. This IC is easy to integrate and can be integrated into the main board circuitry. A block diagram of this IC is shown in FIG. 5. The main connections to the low-power micro 106 will be the STEP 108, DIR 110 (direction), and ENABLEn 112 signals. This IC includes internal MOSFETs for driving the windings 102a and 102b, so only a few external components are needed. The ENABLEn signal 112 can be used to disable power to the motor 100 while the system is stationary to achieve the lowest power consumption.

This stepper motor controller 104 uses high-speed PWM (pulse width modulation) to control its internal MOSFET switches in the motor drivers 538a and 538b in such a way that the motor winding currents do not exceed a specified "chop current". This feature is used to effectively drive the motor windings 102a and 102b with a constant current, but without the disadvantage of wasting power in an analog regulation scheme. The chop current is set by the voltage on the VREF pin 540.

In the illustrated design there are three illustrated examples of ways to set the voltage on this pin. In one implementation, embodiments use a resistor voltage divider between the power supply and ground to set the voltage (and thus the chop current) to a pre-determined level. In another implementation, which can be achieved by loading different components on the PCB, this preset voltage gets modified by the operation of a MOSFET switch and third resistor in such a way that the micro can toggle between two different chop currents by toggling a GPIO line. In a third implementation, which is the most flexible, a high-frequency PWM (pulse width modulated) output from the micro is applied to an RC filter to generate a DC voltage which is fed to the VREF pin 540. This gives the micro 106 complete flexibility to increase or decrease the chop current under software control. This would allow one, for example, to fine tune an acceleration/deceleration profile by dynamically changing the chop current during the interval that the motor 100 is moving.

In another example, a software system can respond to environmental conditions. For example, if a driving belt between the motor 100 and the camera 202 became tighter during cold weather and the required torque increased, the software system could automatically increase the torque by increasing the voltage at the VREF pin 540, thereby increasing the chop current.

Any stepper motor will consume power just holding its current position (i.e. not rotating) with the windings energized. To reduce power, a scheme is employed in which the motor windings 102a and 102b are only energized when the motor 100 is stepping between stops. When the motor/camera has stopped, the windings 102a and 102b are de-energized by driving the active-low ENABLEn input 112 high by the micro 106. This method assumes the detent torque of the stepper motor 100 and the friction in the mechanical system are sufficient to hold the system near motionless when the motor 100 and camera 202 have stopped.

The detent, or non-energized, torque is typically much smaller than the motor's holding torque and is due to the permanent magnets inside the motor 100. Another important aspect is that there should be no external forces acting on the camera 202 that would cause it to rotate or move. This is indeed the case: there will be no wind because the camera 202 is inside a protective housing, and the slip rings 320 do not create any rotational force of their own. In fact the static friction of the slip rings 320 will help hold the camera 202 stationary. Once the system has stopped, it should stay motionless until the stepper motor 100 is again energized.

The amount of torque produced by the stepper motor 100 is a function of the drive current and the speed. The torque drops as the speed increases. Using the selected motor 100, the torque is highest between 0 and 650 steps/sec, but drops to 38% of full torque at 2000 steps/sec. In other words, trying to go faster may require either a more powerful motor or the use of a higher drive current (since motor torque is proportional to current).

The greatest need for torque occurs when first accelerating the camera 202, because the motor 100 needs to overcome any frictional losses as well as the inertia of all the rotating components.

The standard technique, which embodiments use here, is to decrease the spacing (in time) of the step pulses as the system speeds up. This creates an acceleration profile in which the speed ramps up to a maximum value. Similarly, the spacing (in time) between step pulses is decreased to produce a deceleration profile in which the motor's speed decreases from a maximum speed that occurs in the middle of the interval. If the motor cannot produce the required amount of torque then it will "slip", which means that it won't progress to the next step. Having the motor slip ruins the positional integrity of the system and should be avoided.

To profile a system such as this, one should understand what the rotational velocity is during operation. The system is basically a 2nd order mechanical system (friction & inertia) that is being driven by discrete movements of a stepper motor 100 in which the spacing between pulses is changing throughout the interval of movement from one stop position to the next. Monitoring the instantaneous rotational velocity is used to optimize the various parameters of the system. A sensor 208, such as a gyroscope, is used to directly measure rotational velocity. In some embodiments, a ST LY330ALH, a MEMS yaw-rate gyroscope IC, may be used, which produces an analog voltage that is proportional to the instantaneous rotational speed of the camera 202. An evaluation board for this IC can be attached to the top of the camera using double-sticky foam. This IC can be used as a general purpose measurement tool to refine the design of the camera drive system and the methods to synchronize the camera 202 with its rotational motion. One could also use this IC to identify when the camera 202 has stopped moving, although embodiments accomplished this simply by making measurements and then incorporating the resulting wait times into the micro's software.

A low-power micro 106 is used, in the architecture shown in FIG. 3, to handle the following real-time activities:
  Triggering the camera (sync pulse) at a rate between 15 and 30 Hz
  Generating sync pulses that are timed at each stop position
  Generating a signal to gate off unused video frames when the camera is in motion
  Controlling the motor, including acceleration and deceleration
  Sending the camera position to the video/communications processor
  Managing the power state of the entire system
  Controlling power to the motor and video/communications processor
  Monitoring the power supply
  Managing the real-time clock (RTC)

Some embodiments use the Texas Instruments MSP430F5342 available from Texas Instruments Corporation of Dallas, Tex., which has 128 KB of Flash, 10 KB of RAM, and comes in a 48 pin VFQFN package with exposed pad.

Figure 6:
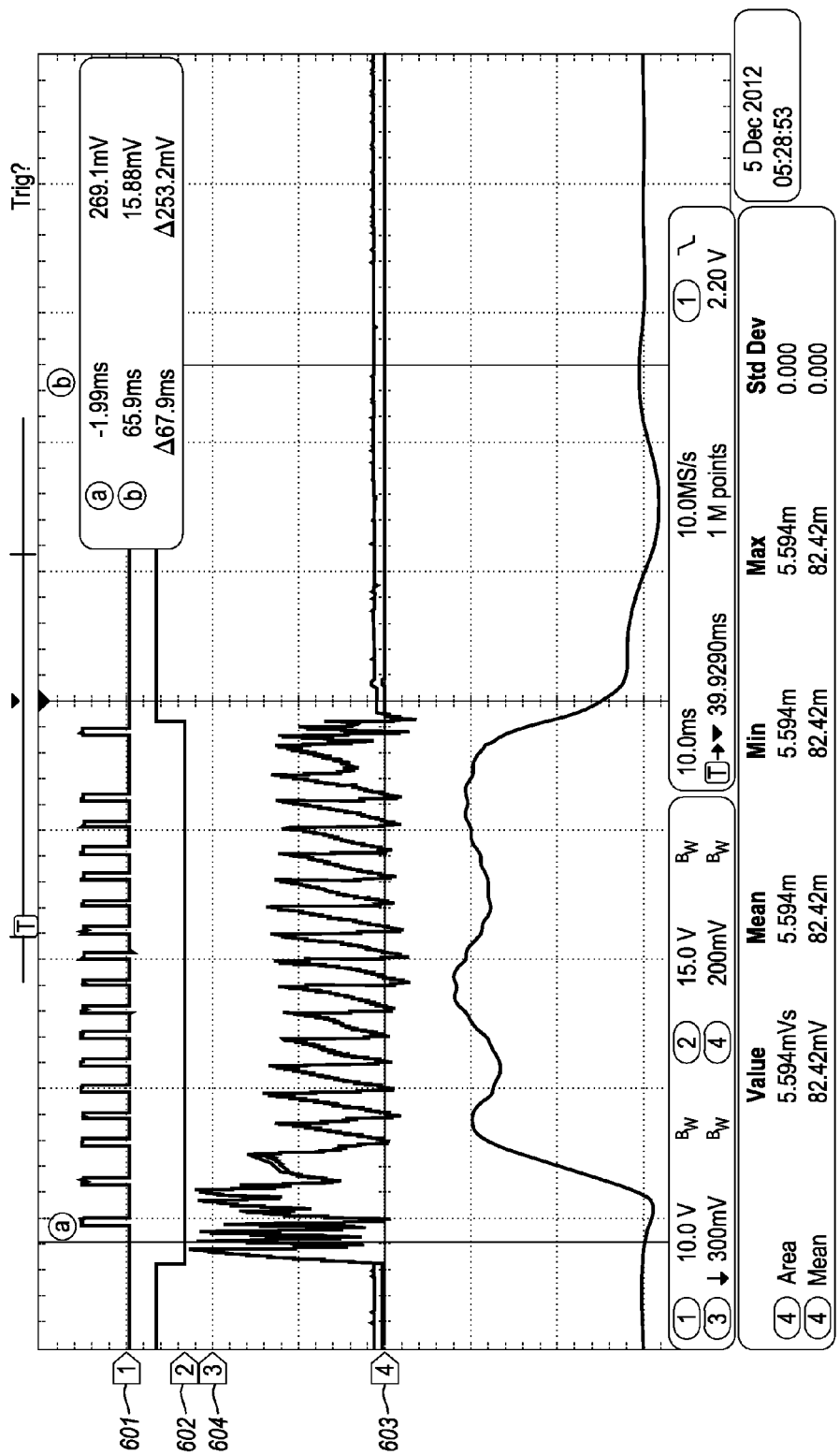
FIG. 6 illustrates measured traces for a stepper motor and various control signals.

Both the speed and the power consumption can be significantly improved by using custom software to control the various signals. For example, the first three pulses may have a longer period (about 3 ms) to facilitate acceleration from 0 RPM, the last pulse may be outputted about 5 ms after the penultimate step pulse to assist deceleration, and the middle pulses may be outputted with a period of about 2 ms (500 Hz) to achieve maximum speed. Finally, the enable signal 112 may be un-asserted shortly after the last pulse to cut average motor power consumption to the minimum. FIG. 6 shows the timing of the improved control signals. Channel 1 illustrated at 601 is the STEP signal 108, Channel 2 illustrated at 602 is the active low ENABLEn signal 112, Channel 3 illustrated at 603 is the analog gyroscope output, and Channel 4 illustrated at 604 is the stepper current waveform.

Refined stepper motor drive timings were constructed for 6, 9, 10, 12, 15, and 16-stop systems. Data from the resulting scope screen shots are presented in the top half 702 of the table 700 illustrated in FIG. 7. For example, for a 10-stop system, it took 68.8 ms to move the camera 202 to the next position and wait for it to stop shaking, but the motor windings 102a and 102b were only energized for 48.4 ms with an average current of 128.1 mA. Assuming an additional waiting time of 63 ms is required to acquire and output an image from the camera 202 at each stop position, the minimum time for a 10-stop revolution would be 1.318 seconds, which corresponds to a maximum speed of 45.5 RPM. The bottom half 704 of the table 700 illustrated in FIG. 7 extrapolates the data from the top portion of the table to estimate the average power for various combinations of speed and stop number. Average power ranges from 0.197 W for a 6-stop system at 10 RPM, to 0.692 W for a 6-stop system at 60 RPM. Combinations that do not provide the camera 202 enough time to acquire images, for example 15 stops and 60 RPM, are not shown.

The software may be further configured to provide continuous rotation for a 10-stop system at 30, 45, and 60 RPM (once again, 60 RPM, for the illustrated embodiment, is too fast for the camera for a 10-stop system). In one implementation, the average current was measured by using a DVM in voltage average mode to record the average voltage across a 1 ohm current sense resistor. The resulting currents were:

30 RPM—32.8 mA (0.394 W)
45 RPM—45.8 mA (0.550 W)
60 RPM—58.4 mA (0.701 W)

These currents were slightly lower than the ones reported in the table illustrated in FIG. 7 and the signals are connected the same as they were in FIG. 6.

Tests were conducted for a 10-stop system rotating at 45 RPM. Measurements of roughly 60 ms between the cessation of movement and the beginning of the next series of step pulses were measured. This is consistent with the table in FIG. 7, which lists 45 RPM as the maximum attainable speed with this motor and drive scheme for a 10-stop system (resulting in 63 ms of stopped time for camera image acquisition).

Figure 8:
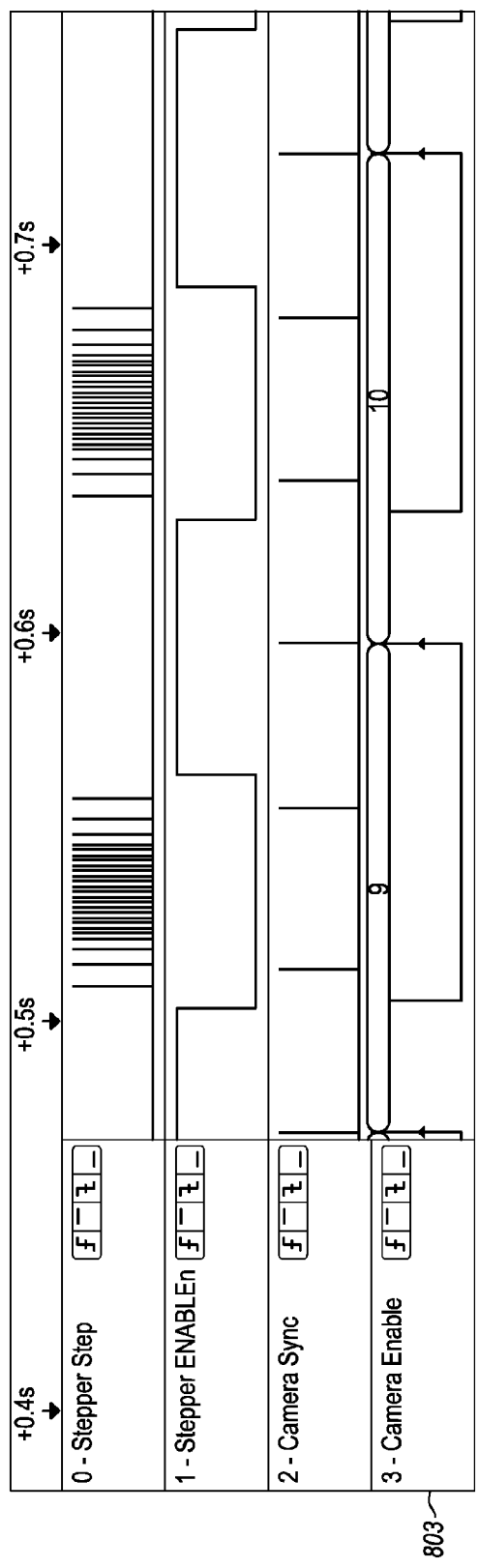
FIG. 8 illustrates a timing chart for stepper motor control.

The signals illustrated in FIG. 8 are from a system with the stepper motor 100 being run at 30 RPM with 16 stops per revolution and synchronizing the camera frames to the movement. The numbers on the Camera Enable signal are the current system stop number of the camera 202 based on the stop bit setting of the real-time microcontroller 106.

Figure 9:
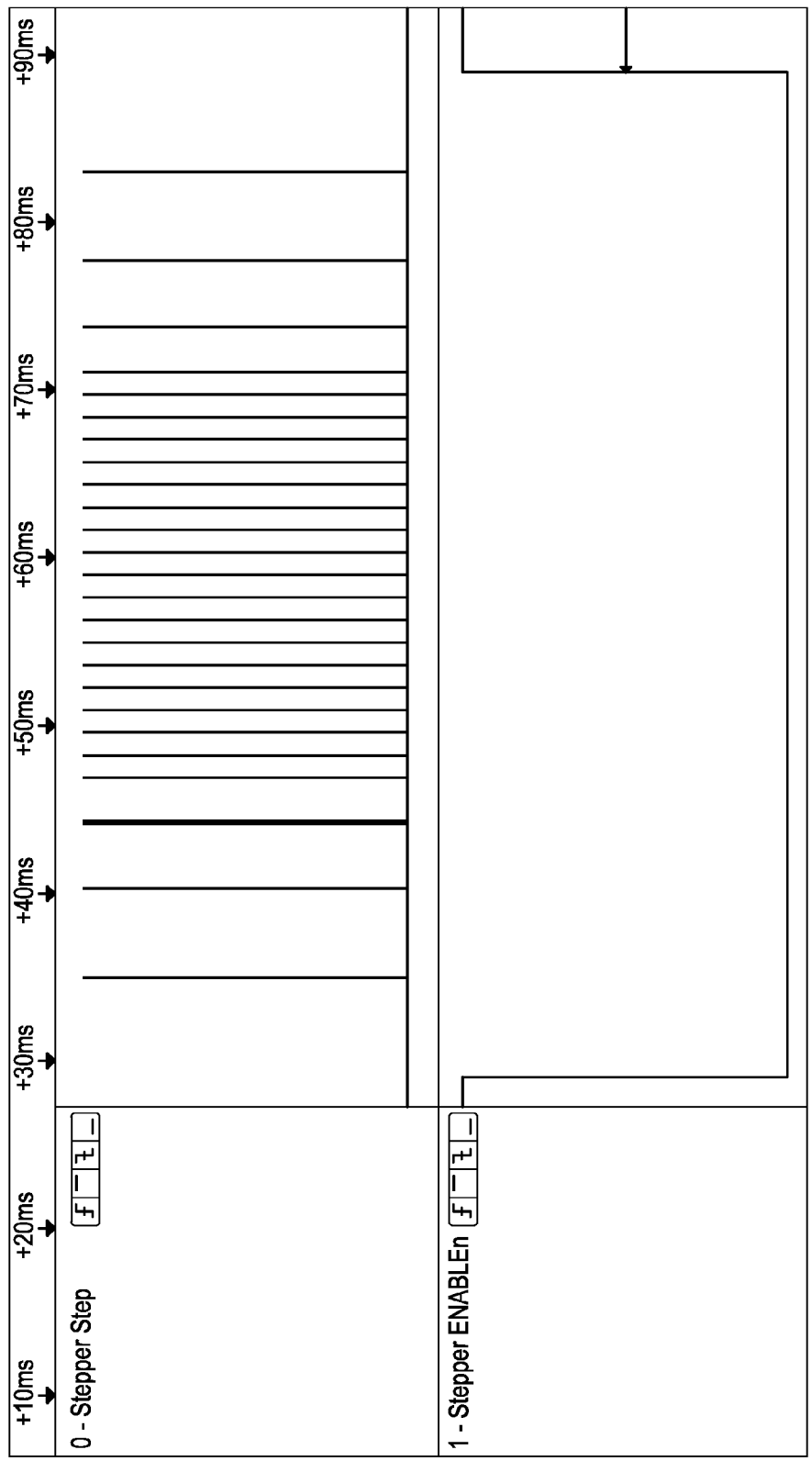
FIG. 9 illustrates another view of a timing chart for stepper motor control.

FIG. 9 shows the new timing for the stepper motor step pulses to get a controlled acceleration and deceleration from the stepper motor 100 and camera 202 mechanical system. The current timing is based on an exponential acceleration and deceleration profile where the acceleration/deceleration pulses are integer multiples of the constant speed pulses.

The exponential acceleration/deceleration performed best (compared to the linear acceleration/deceleration) on the mechanical drive system with the drive belt and slip rings. The linear acceleration/deceleration profile uses a constant increase or decrease in pulse spacing (in time) to reach the constant stepping speed. Linear acceleration/deceleration did not perform as well in the system, even though it reaches the constant speed faster than the exponential timing. The exponential timing works best because it takes a non-negligible amount of time for the "slack" in the drive belt to even out before the camera can move smoothly.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
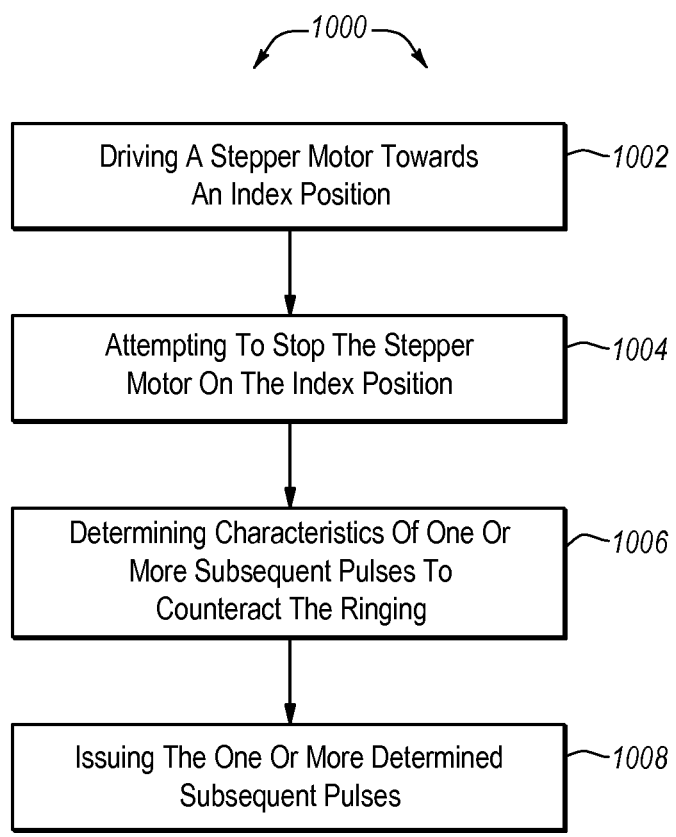
FIG. 10 illustrates a method of controlling a stepper motor.

Referring now to FIG. 10, a method 1000 is illustrated. The method includes acts for controlling a stepper motor. The method 100 includes driving a stepper motor towards an index position (act 1002). For example, the stepper motor 100 may be driven to a position where it can take a picture with a thermal camera 202.

The method 1000 further includes attempting to stop the stepper motor on the index position (act 1004). This may be done in a fashion that would naturally cause the stepper motor to ring at the index position. Examples of how to stop the motor 100 are illustrated above. This may include for example, ramping downs the speed of the stepper motor to a stop position to prevent the stepper motor 100 from slipping.

The method 1000 further includes determining characteristics of one or more subsequent pulses to counteract the ringing (act 1006). For example, embodiments may issue one or more step pulses at appropriate times to deaden the ringing.

The method 1000 further includes issuing the one or more determined subsequent pulses (act 1008) to counteract the ringing. This can be done to settle the rotor (and items attached to it, such as a camera) to a sufficiently still state.

The method 1000 may further include cutting power to the stepper motor following the one or more subsequent pulses. For example, as described above, the enable signal 112 may be driven high which cuts power to the stepper motor 100. Alternatively, embodiments may simply not issue any step pulses once the rotor of the motor reaches a desired point. Thus, the motor can be held in place by its detent torque.

The method 1000 may be practiced where determining characteristics of one or more subsequent pulses to counteract the ringing comprises performing a real-time calculation. For example, an equation or set of equations may take into account various factors such as temperature, motor characteristics, motor inertia, angular velocity, etc. This equation or set of equations may be solved to in real time as the motor is being used to calculate appropriate stop pulses or other actions.

The method 500 may be practiced where determining characteristics of one or more subsequent pulses to counteract the ringing includes referencing previously generated empirical data. For example, embodiments may have stored tables that include temperature information, angular velocities, etc. The tables may identify how this particular system, or similar systems have historically performed. The tables may also include related information regarding stop pulses or other actions. Thus, rather than performing a real-time calculation, embodiments can simply look-up information needed to determine the nature and characteristics of stop pulses or other actions to dampen any ringing.

The method 500 may be practiced where determining characteristics of one or more subsequent pulses to counteract the ringing includes observing a sensor coupled to the stepper motor to determine ringing characteristics. For example, as illustrated above, a gyroscope may be mounted, either directly or indirectly, to the motor rotor. The gyroscope can detect ringing characteristics, which can be used by the system to issue appropriate counteracting pulses or other actions to dampen the ringing quickly.

The method 500 may be practiced where subsequent pulses are shifted in time as compared to one or more stop pulses. Thus, for example, the subsequent pulses may be issued at a time after the stop pulses to dampen ringing.

The method 500 may be practiced where the stepper motor comprises a pair of windings for an index position, and wherein the pulses are issued to each of the windings in the pair of windings, and the subsequent pulses are to one or both of the windings in the pair of windings.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Although the method acts may be discussed in a certain order or illustrated in a flow chart as occurring in a particular order, no particular ordering is required unless specifically stated, or required because an act is dependent on another act being completed prior to the act being performed.

Various specific implementation details are described in Appendix A attached hereto.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for taking thermal images at one or more index positions of at least six index positions of a stepper motor that is coupled to a camera, the method comprising:

driving, using at least one of a fixed drive current, a stepper motor driver, a microcontroller, or information provided by at least one of a gyroscope, a shaft encoder, environmental information, system characteristics, historical data, a look-up table, a photo-interrupter, or a hall-effect sensor, the stepper motor that is coupled to the camera from a first index position towards a second index position of the at least six index positions, each of the at least six index positions associated with a different direction that the camera is facing during a 360° revolution of the camera coupled to the stepper motor, wherein driving the stepper motor towards the second index position comprises changing the direction the camera is facing in a clockwise or counterclockwise direction;

stopping, using at least one of a holding current, a stepper motor driver, a microcontroller, or information provided by at least one of a gyroscope, a shaft encoder, environmental information, system characteristics, historical data, a look-up table, a photo-interrupter, or a hall-effect sensor, the stepper motor at the second index position for at least 30 milliseconds such that motion blurring of an image that is captured while the stepper motor is stopped is minimized, wherein stopping the stepper motor at the second index position causes ringing of the stepper motor at the second index position;

counteracting the stepper motor ringing at the second index position, wherein counteracting the stepper motor ringing comprises:

determining, using at least one of a microcontroller, a stepper motor driver or information provided by at least one of a gyroscope, a shaft encoder, environmental information, system characteristics, historical data, a look-up table, a photo-interrupter, or a hall-effect sensor, one or more counteraction pulses to counteract the ringing at the second index position; and issuing, using the stepper motor driver or the microcontroller, the one or more counteraction pulses;

after counteracting the ringing, capturing, using the camera, a thermal image at the second index position while the stepper motor is stopped; and driving, using at least one of a fixed drive current, a stepper motor driver, a microcontroller, or information provided by at least one of a gyroscope, a shaft encoder, environmental information, system characteristics, historical data, a look-up table, a photo-interrupter, or a hall-effect sensor, the stepper motor towards a third index position, wherein the stepper motor performs one or more 360° revolutions at a speed of at least 10 revolutions per minute and stops at each of the at least six index positions for at least 30 milliseconds during each of the one or more revolutions, wherein the camera is configured to capture images while stopped at one or more of the index positions during each revolution performed such that at least one captured image corresponds to one of the at least six index positions and at least one captured image does not correspond to any of the at least six index positions, wherein each of the at least one captured image that does not correspond to any of the at least six index positions is discarded by a digital switch.

2. The method of claim 1, wherein a sensor is also coupled to the stepper motor.

3. The method of claim 2, wherein the one or more index positions are determined based on a position of the sensor that is coupled to the stepper motor.

4. The method of claim 1, further comprising cutting power to the stepper motor following issuance of the one or more counteraction pulses.

5. The method of claim 1, wherein determining one or more counteraction pulses to counteract the ringing at the second index position comprises performing a real-time calculation.

6. The method of claim 1, wherein information provided by historical data comprises referencing previously generated empirical data.

7. The method of claim 1, wherein determining one or more counteraction pulses to counteract the ringing at the second index position comprises observing a gyroscope coupled to the stepper motor to determine ringing characteristics.

8. The method of claim 1, wherein the one or more counteraction pulses are shifted in time as compared to a stop pulse.

9. The method of claim 1, wherein the stepper motor comprises a pair of windings for an index position, and wherein a first pulse is issued to each of the windings in the pair of windings to drive the stepper motor to the second index position, and subsequently, the one or more counteraction pulses are issued to one or both of the windings in the pair of windings to counteract ringing at the second index position.

10. The method of claim 1, wherein environmental information comprises one or more of temperature of the system, angular velocity of a rotor, index position, instantaneous rotational position, or system inertia.

11. A computer system, comprising:

a stepper motor that is coupled to a camera;

one or more processors; and one or more computer readable storage media having stored thereon computer-executable instructions that are executable by the one or more processors to cause the computer system to take thermal images at one or more index positions of at least six index positions of the stepper motor, the computer-executable instructions including instructions that are executable to cause the computer system to perform at least the following:

drive, using at least one of a fixed drive current, a stepper motor driver, a microcontroller, or information provided by at least one of a gyroscope, a shaft encoder, environmental information, system characteristics, previously historical data, a look-up table, a photo-interrupter, or a hall-effect sensor, the stepper motor that is coupled to the camera from a first index position towards a second index position of the at least six index positions, each of the at least six index positions associated with a different direction that the camera is facing during a 360° revolution of the camera coupled to the stepper motor, wherein driving the stepper motor towards the second index position comprises changing the direction the camera is facing in a clockwise or counterclockwise direction;

stopping, using at least one of a holding current, a stepper motor driver, a microcontroller, or information provided by at least one of a gyroscope, a shaft encoder, environmental information, system characteristics, historical data, a look-up table, a photo-interrupter, or a hall-effect sensor, the stepper motor at the second index position for at least 30 milliseconds such that motion blurring of an image that is captured while the stepper motor is stopped is minimized, wherein stopping the stepper motor at the second index position causes ringing of the stepper motor at the second index position;

counteract the stepper motor ringing at the second index position, wherein counteracting the stepper motor ringing comprises:

determining, using at least one of a microcontroller, a stepper motor driver or information provided by at least one of a gyroscope, a shaft encoder, environmental information, system characteristics, historical data, a look-up table, a photo-interrupter, or a hall-effect sensor, one or more counteraction pulses to counteract the ringing at the second index position; and issuing, using the stepper motor driver or the microcontroller, the one or more counteraction pulses;

after counteracting the ringing, capture, using the camera, a thermal image at the second index position while the stepper motor is stopped; and drive, using at least one of a fixed drive current, a stepper motor driver, a microcontroller, or information provided by at least one of a gyroscope, a shaft encoder, environmental information, system characteristics, historical data, a look-up table, a photo-interrupter, or a hall-effect sensor, the stepper motor towards a third index position, wherein the stepper motor performs one or more 360° revolutions at a speed of at least 10 revolutions per minute and stops at each of the at least six index positions for at least 30 milliseconds during each of the one or more revolutions, wherein the camera is configured to capture images while stopped at one or more of the index positions during each revolution performed such that at least one captured image corresponds to one of the at least six index positions and at least one captured image does not correspond to any of the at least six index positions, wherein each of the at least one captured image that does not correspond to any of the at least six index positions is discarded by a digital switch.

12. The computer system of claim 11, wherein the camera comprises a thermal camera coupled to a rotor of the stepper motor.

13. The computer system of claim 11, wherein a sensor is mechanically coupled to a rotor of the stepper motor and electronically coupled to a controller that is coupled to the stepper motor, wherein the controller is configured to determine one or more characteristics of the one or more counteraction pulses to counteract ringing at the second index position.

14. The computer system of claim 13, wherein the sensor is a gyroscope.

15. The computer system of claim 13, wherein the controller is configured to use feedback from the sensor to determine one or more characteristics of the one or more counteraction pulses to counteract ringing at the second index position.

16. The computer system of claim 13, wherein the controller has access to an equation for determining one or more characteristics of the one or more counteraction pulses to counteract ringing at the second index position.

17. The computer system of claim 13, wherein the historical data includes a store of historical data that can be used to determine one or more characteristics of the one or more counteraction pulses to counteract ringing at the second index position.

18. A computer program product comprising one or more hardware storage devices having stored thereon computer-executable instructions that are executable by one or more processors of a computer system to cause the computer system to take thermal images at one or more index positions of at least six index positions of a stepper motor that is coupled to a camera, the computer-executable instructions including instructions that are executable to cause the computer system to perform at least the following:
  drive, using at least one of a fixed drive current, a stepper motor drive microcontroller, or information provided by at least one of a gyroscope, a shaft encoder, environmental information, system characteristics, historical data, a look-up table, a photo-interrupter, or a hall-effect sensor, the stepper motor that is coupled to the camera from a first index position towards a second index position of the at least six index positions, each of the at least six index positions associated with a different direction that the camera is facing during a 360° revolution of the camera coupled to the stepper motor, wherein driving the stepper motor towards the second index position comprises changing the direction the camera is facing in a clockwise or counterclockwise direction;
  stop, using at least one of a holding current, a stepper motor driver, a microcontroller, or information provided by at least one of a gyroscope, a shaft encoder, environmental information, system characteristics, historical data, a look-up table, a photo-interrupter, or a hall-effect sensor, the stepper motor at the second index position for at least 30 milliseconds such that motion blurring of an image that is captured while the stepper motor is stopped is minimized, wherein stopping the stepper motor at the second index position causes ringing of the stepper motor at the second index position;
  counteract the stepper motor ringing at the second index position, wherein counteracting the stepper motor ringing comprises:
    determining, using at least one of a microcontroller, a stepper motor driver or information provided by at least one of a gyroscope, a shaft encoder, environmental information, system characteristics, historical data, a look-up table, a photo-interrupter, or a hall-effect sensor, one or more counteraction pulses to counteract the ringing at the second index position; and
    issuing, using the stepper motor driver or the microcontroller, one or more counteraction pulses;
  after counteracting the ringing, capture, using the camera, a thermal image at the second index position while the stepper motor is stopped; and
  drive, using at least one of a fixed drive current, a stepper motor driver, a microcontroller, or information provided by at least one of a gyroscope, a shaft encoder, environmental information, system characteristics, historical data, a look-up table, a photo-interrupter, or a hall-effect sensor, the stepper motor towards a third index position, wherein the stepper motor performs one or more 360° revolutions at a speed of at least 10 revolutions per minute and stops at each of the at least six index positions for at least 30 milliseconds during each of the one or more revolutions, wherein the camera is configured to capture images while stopped at one or more of the index positions during each revolution performed such that at least one captured image corresponds to one of the at least six index positions and at least one captured image does not correspond to any of the at least six index positions, wherein each of the at least one captured image that does not correspond to any of the at least six index positions is discarded by a digital switch.

19. The computer program product of claim 18, wherein information provided by historical data comprises referencing previously generated empirical data.

20. The computer program product of claim 18, wherein system characteristics comprise one or more of motor size, camera weight, or number of requested steps.

* * * * *